Sept. 20, 1966    W. B. MOGENSEN    3,273,556
OUTDOOR GRILL
Filed Nov. 20, 1964
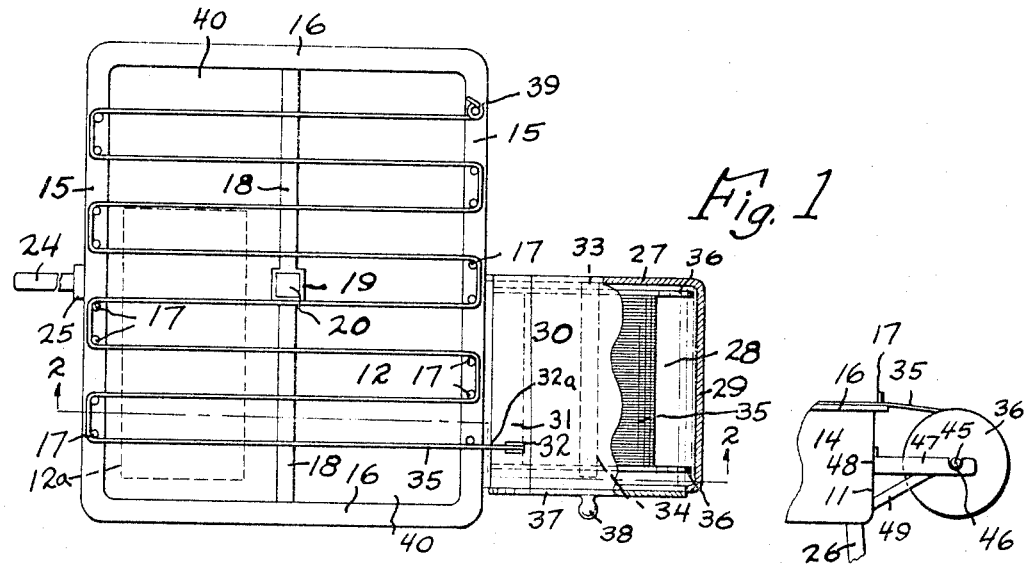
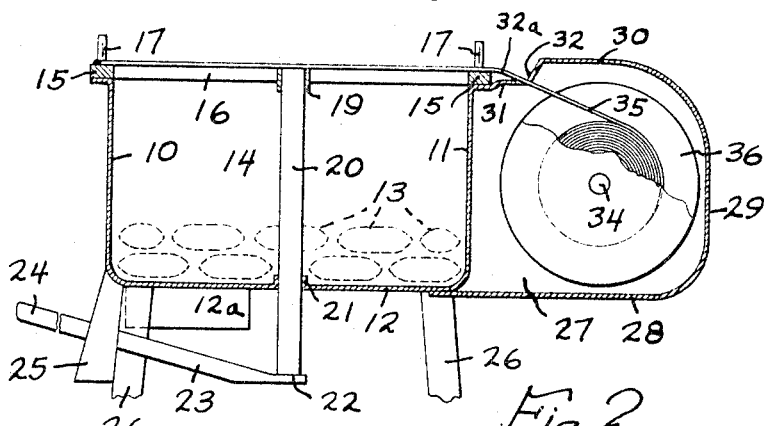
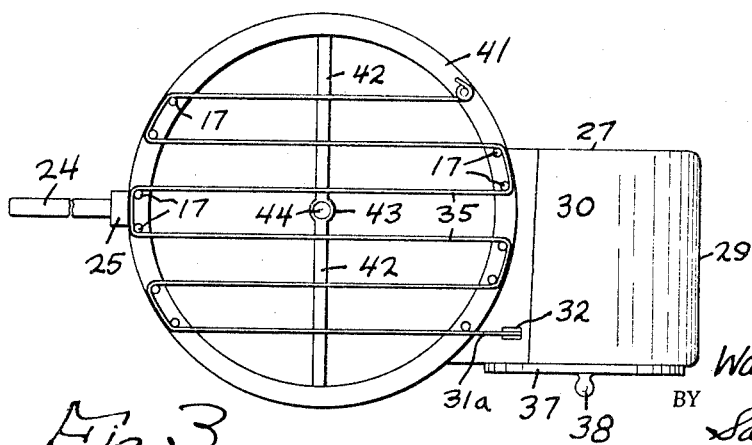
INVENTOR.
Warren B. Mogensen
BY Sam J. Slotsky
ATTORNEY

United States Patent Office 3,273,556
Patented Sept. 20, 1966

3,273,556
OUTDOOR GRILL
Warren B. Mogensen, 1609 E. 32nd St.,
Sioux Falls, S. Dak.
Filed Nov. 20, 1964, Ser. No. 412,739
5 Claims. (Cl. 126—25)

My invention relates to an outdoor grill.

An object of my invention is to provide an outdoor grill having certain characteristics wherein the grill itself can be formed of ordinary wire, so that the wire can be discarded after use thereby providing an arrangement which will not require the cumbersome scraping and cleaning of the present type of cast iron grills.

A further object of my invention is to provide a reel arrangement so as to maintain a constant supply of wire for the grill, and whereby several grills can be formed before a new reel of wire need be supplied.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a plan view of a preferred type of grill employing my invention,

FIGURE 2 is a sectional view taken substantially along the lines 2—2 of FIGURE 1, FIGURE 3 illustrates a circular type of grill employing my invention, FIGURE 4 is a reduced side portion view of a modification, and, FIGURE 5 is a further modification.

My invention contemplates the provision of an outdoor disposable wire grill, and wherein a fresh supply of wire can be used each time for the grill, after which the wire can be thrown away and a new supply used, this arrangement thereby eliminating the objectionable features of scouring and cleaning the usual cast iron grills, this feature also providing sanitary features.

In describing my invention I have used the character 10 to indicate a side wall of the lower portion of the device, the character 11 indicating a further side wall, the character 12 indicating the bottom wall upon which is placed the heating coals 13. I have further used the character 14 to indicate end walls, and the character 15 indicates the side portions of a grill member having the integral end portions 16 thereby forming a rectangle, and attached to the members 15 are the spaced vertical pins 17. The character 18 designates a bar attached to the portion 16, which bar is attached to the square socket 19 which is attached to the square post 20, the post 20 passing through the square portion 21 attached to the bottom wall 12, the post 20 abutting at 22 against the end of the lever member 23 terminating in the handle portion 24, the lever member 23 being pivoted within the member 25, thereby providing means for raising or lowering the grill as required.

The character 26 indicates legs which are suitably attached to the grill portions to support the same. I have further used the character 27 to indicate a side wall of a casing, the character 28 indicating the bottom wall of this casing, the character 29 indicating the vertical wall of the casing and the character 30 indicating the upper wall extending into the wall portion 31 including an opening at 32.

Attached at 33 to the wall 27 is a horizontally positioned rod 34 which receives a spool of wire 35, this reel having the circular end flanges 36. The character 37 indicates a vertically positioned circular lid having the handle 38 whereby the lid can be removed to place further spools of wire therein.

The device is used in the following manner. The grill is formed by merely drawing on the outer end of the wire 35 which passes through the opening 32, sufficient wire being drawn out of the casing in which the reel is located and the wire is merely wound about the various pins 17 as shown clearly in FIGURE 1, and at the final pin the wire can be wound about the pin as shown at 39. The grill is thereby formed and the cooking operation can take place. The coals can be inserted through the spaces 40, or can be inserted before the grill is formed, whichever is desired. During any adjustment of the grill vertically by means of the lever 23, the wire will merely unreel to provide for this adjustment, the grill being shown at its lower-most point in FIGURE 2. After use the wire can be snipped off at the point 32a by means of an ordinary pliers, etc., the used grill wire is unwound and thrown away, and this operation is repeated in providing a new grill. The character 12a designates a counter weight member attached to the base 12 for counterbalancing the reel, etc.

FIGURE 3 illustrates a modification and wherein identical characters indicate identical parts, and in this modification the arrangement is circular in shape, the character 41 indicating a circular grill member to which is attached the transverse bars 42 which are attached to the cylindrical sleeve 43 which receives the round vertical shaft 44 which is operated by a similar lever member 23, etc., this arrangement providing for rotation of the grill 41 if such is desired, the rotation also being easily effected since the wire will unreel from the reel itself.

FIGURE 4 illustrates a further modification wherein the casing for containing the reel need not be employed and wherein the reel will have the rod 45 which is supported within the depressions 46 in the bars 47 which can be attached at 48 to the wall 11, the character 49 indicating braces.

FIGURE 5 illustrates a slight modification which can be used if desired, the character 50 indicating an edge over which the wire 35 passes, the character 51 indicating ears to which the cutting bar 52 is pivoted at 53, the character 54 indicating a sharpened and hardened edge, whereby when the lever 52 is swung in the direction of the arrow 55 downwardly the wire 55 will be cut off, this arrangement being suitably attached adjacently to the opening 32 in any desired manner.

It will now be noted that I have provided the various advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may reasonably be included within their scope.

I claim as my invention:

1. An outdoor grill comprising a grill framework, a plurality of vertically positioned spaced pins attached to said framework, a disposable wire member wound about said pins to provide a grill surface.

2. An outdoor grill comprising a grill framework, a plurality of vertically positioned spaced pins attached to said framework, a disposable wire member wound about said pins to provide a grill surface, a wire reel positioned adjacently to said grill, said wire reel providing a continuous supply of wire for said disposable wire member.

3. An outdoor grill comprising a grill framework, a plurality of vertically positioned spaced pins attached to said framework, a disposable wire member wound about said pins to provide a grill surface, a wire reel positioned adjacently to said grill, said wire reel providing a continuous supply of wire for said disposable wire member, a casing enclosing said wire reel, said casing having an opening for permitting passage of wire therethrough.

4. An outdoor grill comprising a grill framework, a plurality of vertically positioned spaced pins attached to said framework, a disposable wire member wound about said pins to provide a grill surface, a wire reel positioned adjacently to said grill, said wire reel providing a continuous supply of wire for said disposable wire member, a casing enclosing said wire reel, said casing having an opening for permitting passage of wire therethrough, a cutting member positioned adjacently to said grill framework for cutting off wire after use thereof.

5. An outdoor grill comprising a grill framework, a plurality of vertically positioned spaced pins attached to said framework, a disposable wire member wound about said pins to provide a grill surface, a wire reel positioned adjacently to said grill, said wire reel providing a continuous supply of wire for said disposable wire member, a casing enclosing said wire reel, said casing having an opening for permitting passage of wire therethrough, a cutting member positioned adjacently to said grill framework for cutting off wire after use thereof, a grill pan positioned beneath said grill framework, means for adjustably positioning said framework.

References Cited by the Examiner
UNITED STATES PATENTS 3,082,757   3/1963   Hohe _____ 126—39 X FREDERICK KETTERER, *Primary Examiner.*